United States Patent
Ikoma

(10) Patent No.: US 6,175,403 B1
(45) Date of Patent: Jan. 16, 2001

(54) PRINTER CONTROL PICTORIAL TOOL FOR USE IN SETTING UP PRINTING CONDITIONS OF PHOTO-PRINTER

(75) Inventor: Hideto Ikoma, Kanagawa (JP)

(73) Assignee: Fuji Photo Film Co., Ltd., Kanagawa (JP)

( * ) Notice: Under 35 U.S.C. 154(b), the term of this patent shall be extended for 0 days.

(21) Appl. No.: 09/222,942

(22) Filed: Dec. 30, 1998

(30) Foreign Application Priority Data

Feb. 6, 1998 (JP) .................................................. 10-026212

(51) Int. Cl.$^7$ ............................ G03B 27/52; G03B 27/72
(52) U.S. Cl. ................................ 355/41; 355/35; 355/67; 355/27; 355/40
(58) Field of Search ................................ 355/41, 35, 67, 355/27, 40

(56) References Cited

U.S. PATENT DOCUMENTS

| | | | |
|---|---|---|---|
| 5,083,154 | * 1/1992 | Terashita et al. | 355/68 |
| 5,223,891 | * 6/1993 | Fierstein et al. | 355/38 |
| 5,233,386 | * 8/1993 | Terashita | 355/41 |
| 5,245,383 | * 9/1993 | Matsushita et al. | 355/38 |
| 5,262,821 | * 11/1993 | Hosoya | 355/41 |
| 5,357,315 | * 10/1994 | Suzuki | 355/77 |
| 5,870,175 | * 2/1999 | Nakaya | 355/40 |
| 5,876,876 | * 3/1999 | Otake | 430/4 |
| 5,883,699 | * 3/1999 | Kuramitsu et al. | 355/40 |
| 5,969,797 | * 10/1999 | Ajimu et al. | 355/40 |
| 5,987,220 | * 11/1999 | Terajima et al. | 395/109 |

OTHER PUBLICATIONS

Patent Application No. U.S. Ser. No. 08/679750.*

* cited by examiner

*Primary Examiner*—Russell Adams
*Assistant Examiner*—Khaled Brown
(74) *Attorney, Agent, or Firm*—Sughrue, Mion, Zinn, Macpeak & Seas, PLLC

(57) ABSTRACT

A printer control pictorial tool consists of an eye portion having a neutral gray, portraits arranged around the eye portion, and a gray background. The eye portion and the portraits are located within a photometric range that is equal to or less than a range covered by a photometry device of a photo-printer. The gray background has the same average gray density as the eye portion has. An area having a complementary color to a flesh color of the portraits is provided within the photometric range. The size, color and density of the portraits and the complementary color area are determined such that photometric values obtained from the photometric range are approximately equal to those obtained from the eye portion.

17 Claims, 6 Drawing Sheets

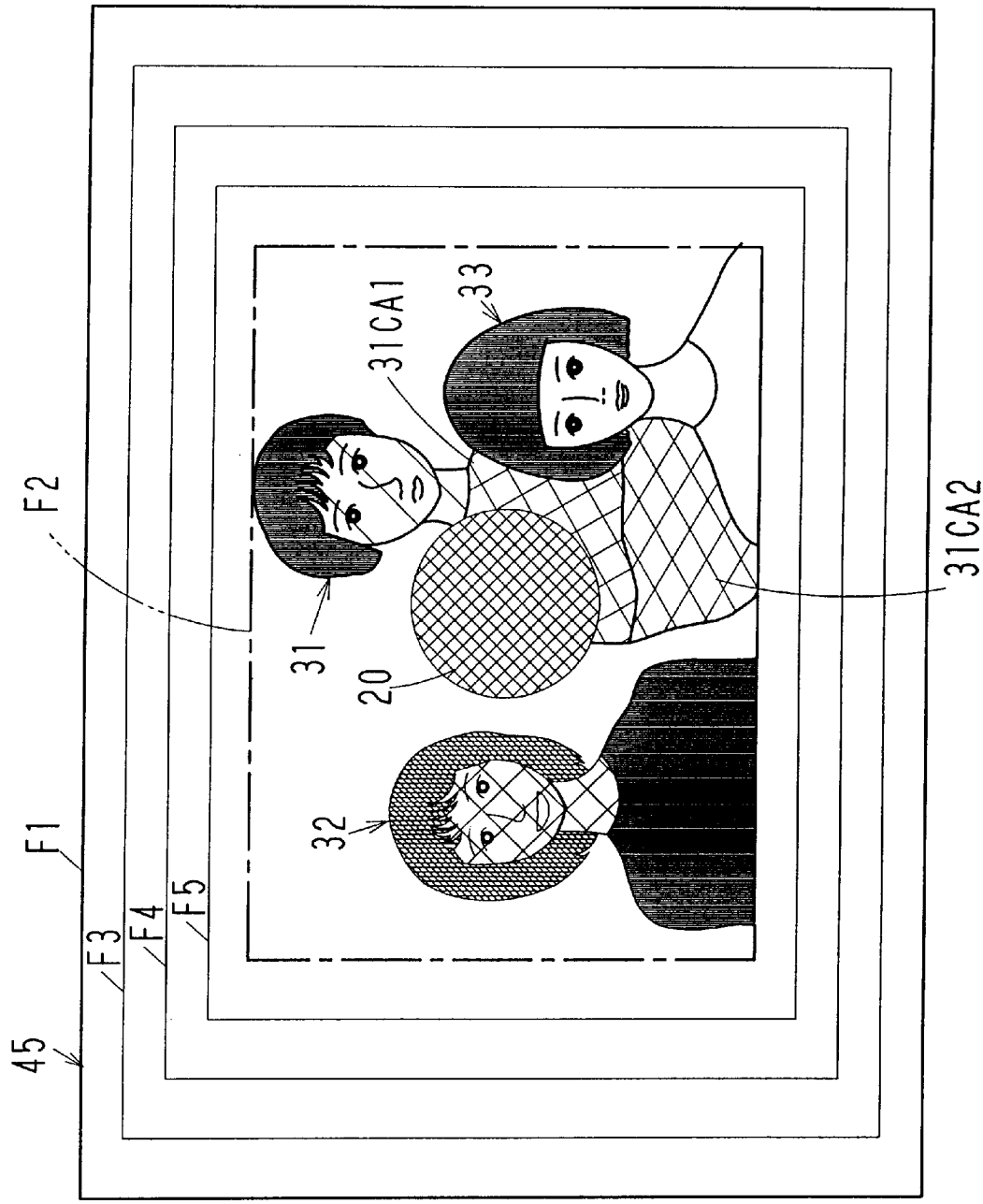

PRINTER CONTROL PICTORIAL TOOL FOR USE IN SETTING UP PRINTING CONDITIONS OF PHOTO-PRINTER

BACKGROUND OF THE INVENTION

1. Field of the Invention

The present invention relates to a printer control pictorial tool for use in setting up an automatic photo-printer to proper printing conditions. More particularly, the present invention relates to a printer control pictorial tool which enables setting up proper printing conditions in any kind of photo-printer.

2. Background Arts

An automatic photo-printer measures three color densities of an original to be printed and determines appropriate print-exposure times for three colors in accordance with the measured three color densities. To maintain the photo-printer in proper printing conditions that are relevant to the exposure determination, the printing conditions are checked and corrected prior to the practical printing. For this purpose, a sample print is made from a reference original having standard three color densities that are designed to represent standard customer's photographic originals forwarded to photofinisher for printing. The sample print is compared to a reference print that is previously made from the reference original under optimum conditions by a manufacturer.

A conventional reference original has a pattern consisting of a round gray center portion and a background, called Bull's eye. Usually, four control negative frames of the same pattern are recorded in series on a filmstrip at different exposure amounts to provide a printer control film. In addition to these frames, i.e., normal-, under-, over- and super over-exposed frames, the printer control film has an unexposed frame having no image recorded thereon, so as to represent a basic density of the photo film.

The normal-exposed control negative frame is used as the reference original. Generally, most customer's negatives are photographed in daylight, i.e., outdoors from 10 a.m. to 2 p.m., or under similar lighting conditions to the daylight, at proper exposure values determined based on the film speed, so that most negatives have normal image densities. Usually, human subjects occupy about one-third of the entire area of each negative frame, and the remaining portion, i.e. the background, is occupied by landscapes such as trees, sky, buildings, road and so forth. In principle, a mixed light of three color light components transmitted through a properly exposed negative is gray. Therefore, the reference original contains the round gray pattern or so-called eye portion.

A kit of printer control films of different film types are supplied in combination with their reference prints to photo-printer's users. The printer control films and the reference prints are called printer control tools in this field.

There have been printer control tools which use a pictorial full-color image such as portraits in place of the eye portion, in order to make it easy to check with the naked eye if color balance and densities of the sample print are proper or not. Also printer control tools having both a gray eye portion and a pictorial image are disclosed, for example, in JPA 9-26633. Hereinafter, those printer control tools containing a pictorial image will be called printer control pictorial tools.

Since the automatic photo-printer makes a sample print from a reference original at exposure times determined for three colors in accordance with three color densities of the reference original measured by a photometry device of the photo-printer, in the same way as in the practical printing, characteristics of the photometry device and algorithms for determining exposure times have influence on density and color balance of the consequent sample print.

Because different types of photo-printers have different photometry devices and different algorithms, the sample prints obtained from the conventional printer control pictorial tools are apt to be affected by the difference in the photometry device and the algorithm, especially by the differences in photometric range covered by the photometry section, that is, the range subjected to the photometry on each original frame, have a large influence on the quality of sample print. This is because photometric values and the algorithms for the exposure determination are affected by the layout of the full-color pictorial image, such as color arrangement and contrast.

SUMMARY OF THE INVENTION

In view of the foregoing, an object of the present invention is to provide printer control tools which are useful for setting up printing conditions of different types of photo-printers, and are little affected by the differences in the exposure determination algorithms and the differences in the photometric range of the different types of photo-printers.

To achieve the above object, the present invention provides a printer control pictorial tool with a gray area having a neutral gray on a positive; a pictorial image including at least a portrait; and a background area having the same neutral gray as the gray area has on the positive, wherein the gray area and the pictorial image are located within a photometric range that is equal to or less than a range covered by a photometry device of a photo-printer, and the pictorial image is determined in size, color and density such that photometric values obtained from the photometric range are approximately equal to photometric values obtained from the gray area.

Because photometric values obtained from the photometric range are approximately equal to those obtained from the gray area, and also the background area has the same neutral gray as the gray area has, photometric values measured through the photometry device of the photo-printer are substantially unchanged even when the range covered by the photometry device changes so far as the range covered by the photometry device is not less than the photometric range. Since the photometric range of the printer control pictorial tool of the invention is equal to or less than the range covered by the photometry device of the photo-printer, photometric values obtained from the printer control pictorial tool of the invention are not affected by the pictorial image.

According to a preferred embodiment, the printer control pictorial tool further contains within the photometric range a complementary color area having a complementary color to a flesh color of a face area of the portrait. The complementary color area is designed to cancel the hue of the flesh color. The complementary color area may be provided as a clothes area of the portrait. The complementary color area may be provided separately from the portrait.

Providing a plurality of portraits having face areas of different tones of flesh color and clothes areas of different tones of achromatic color, makes it easy to inspect density and color balance of a sample print made from the printer control pictorial tool with the naked eye.

Instead of providing the complementary color area to the flesh color, it is possible to make the background area have a gray color with a tinge of a complementary color to the flesh color inside the photometric range, and the same neutral gray as the gray area outside the photometric range.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein:

FIG. 6 is an explanatory diagram illustrating a print obtained from a printer control negative according to still another embodiment of the invention.

DETAILED DESCRIPTION OF THE PREFERRED EMBODIMENT

Figure 1:
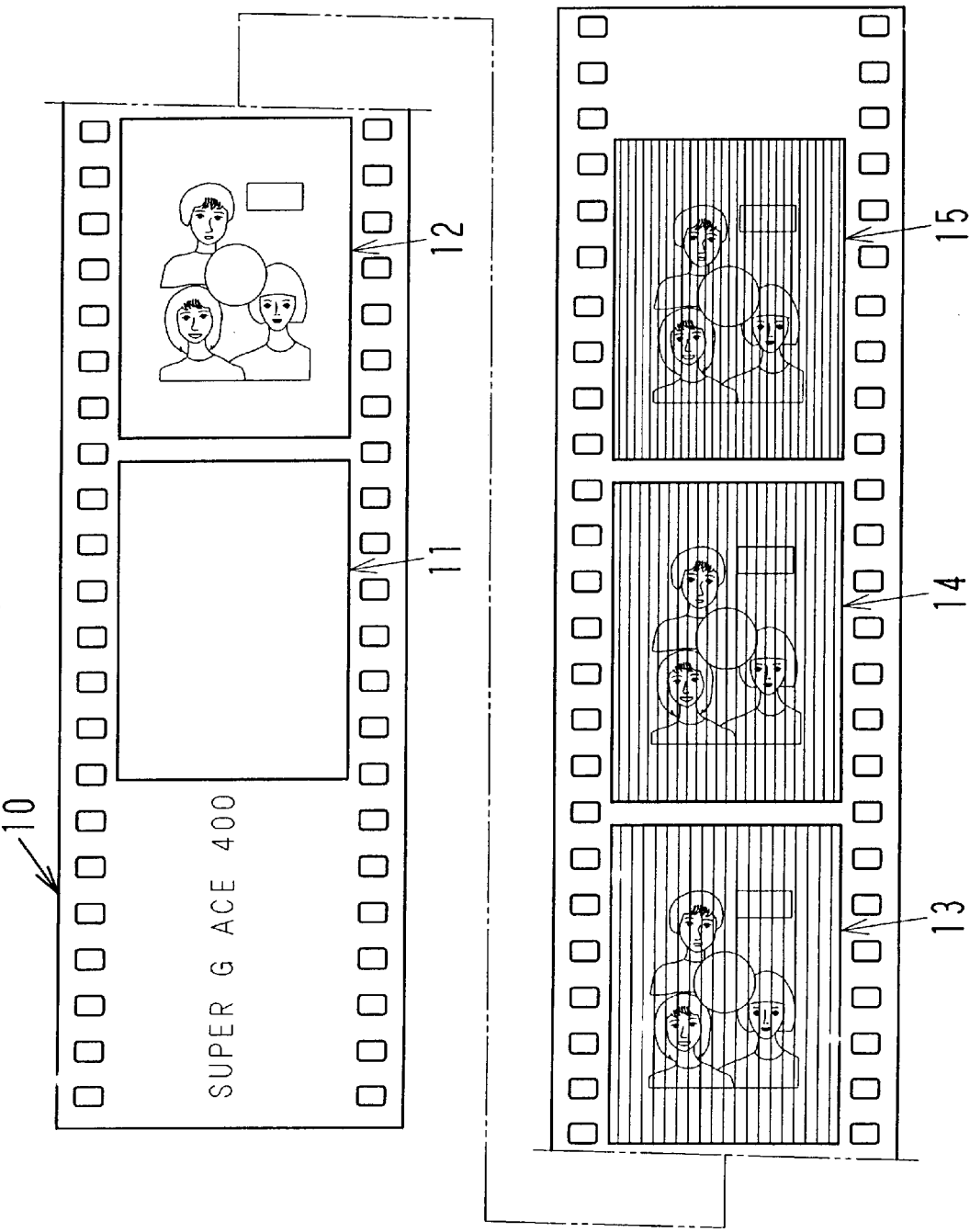
FIG. 1 is an explanatory diagram illustrating a printer control negative film as a printer control pictorial tool according to an embodiment of the invention.

In FIG. 1, a printer control negative film 10 has an unexposed frame 11 to represent a basic density of the negative film, an under-exposed frame 12, a normal-exposed frame 13, an over-exposed frame 14 and a super over-exposed frame 15. The printer control negative film 10 is produced for each film type.

Figure 2:
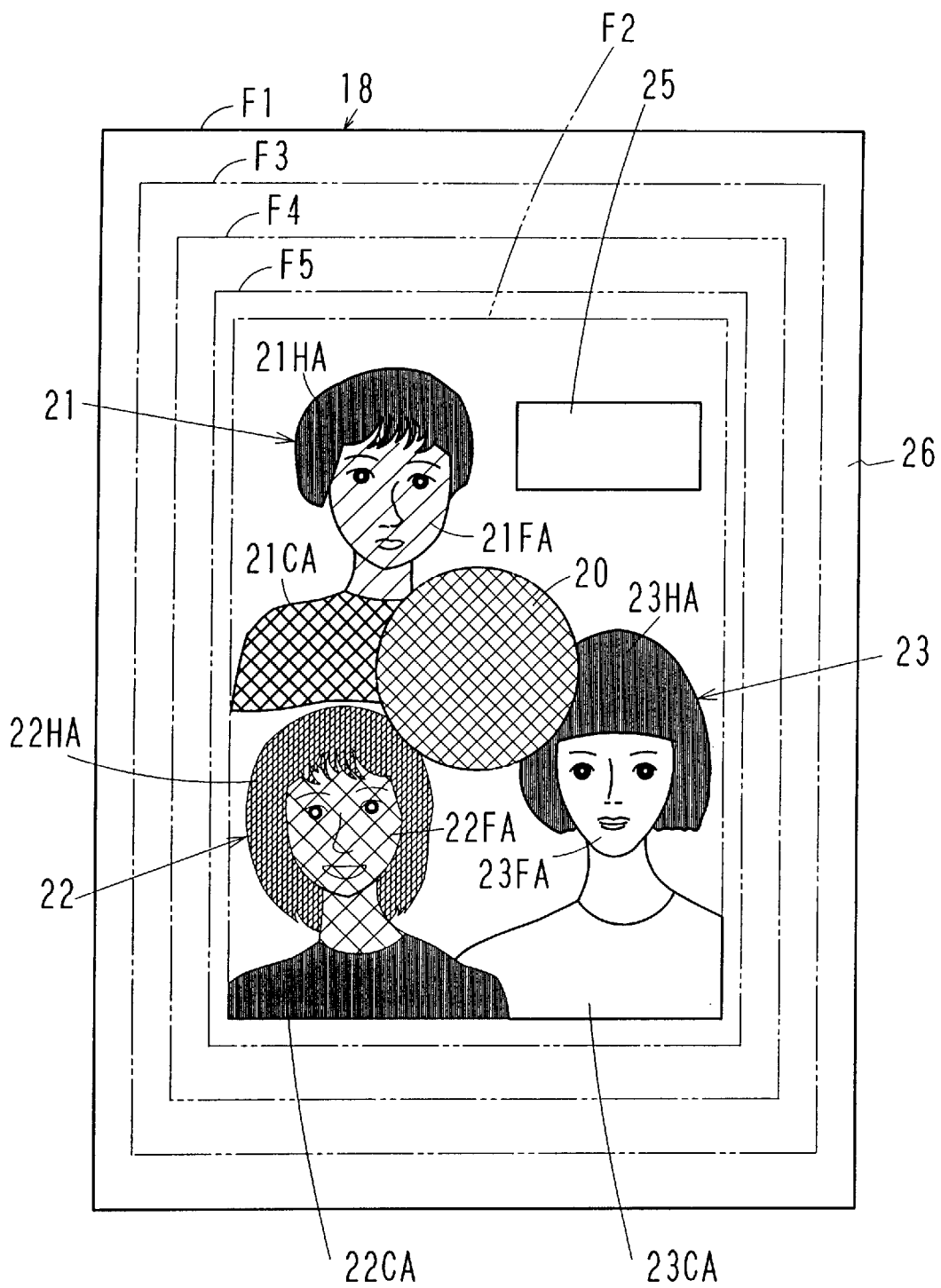
FIG. 2 is an explanatory diagram illustrating an example of print obtained from a normal-exposed frame of the printer control negative film of FIG. 1.

Since the image of each frame of the control negative film 10 is a negative image that is difficult to illustrate, the frames 12 to 15 shown in FIG. 1 do not show the detail of their images, but show only outlines and the global or average densities of the respective images. Because a positive image is convenient to explain the inventive feature, the following description will be based on a positive image of a print 18 made from the normal exposure frame 13, as shown in FIG. 2. The densities of the negative frames 12 to 15 are reverse to those shown in the print 18. In addition, because the film base density of the negative film 10 is different according to the film type, the densities of the respective elements of the normal-exposed frame 13 or those of the other frames vary depending upon the film type.

If the normal-exposed frame 13 is printed under optimum printing conditions, a reference print is provided. To obtain a sample print for setting up printing conditions in a photo-printer, the normal-exposed frame 13 is printed under default printing conditions, i.e. without effecting any exposure correction in the photo-printer.

At a center of the normal-exposed frame 13, there is a round eye portion 20 in the same way as the conventional control negative. The eye portion 20 is gray and has an uniform density in the reference print. For example, three color densities of the eye portion 20 are determined to have a value of 0.7 in the reference print: yellow (Y)=0.7, magenta (M)=0.7, cyan (C)=0.7. The three color densities of the eye portion 20 in the reference print may change in a range from 0.6 to 0.9 according to the types of photo-printers. Thus, a sample print made from one of the frames 12 to 15 is not only compared with the reference print with the naked eye, but also three color densities of the sample print and those of the reference print are measured from the eye portion 20 by a densitometer.

Although some conventional printer control negatives have an eye portion which is rimmed by an annular boundary zone, if the boundary zone is wide and has a high or a low density in comparison with the eye portion, the boundary zone has too large an influence on the photometry. Therefore, it is preferable to omit the boundary zone, or make the boundary zone as narrow as possible and have a small density difference from the eye portion.

Portraits 21, 22 and 23 are arranged around the eye portion 20. The portrait 21 on the upper left side of the eye portion 20 has a face area 21FA of a standard flesh color on the print 18, and the portrait 22 on the lower left side of the eye portion 20 has a face area 22FA of a dark flesh color on the print 18, whereas the portrait 23 on the lower right side of the eye portion 20 has a face 23FA of a light flesh color on the print 18. The dark flesh color of the face area 22FA is 10% darker than the standard flesh color, whereas the light flesh color of the face area 23FA is 10% lighter than the standard flesh color. But this ratio may be modified appropriately. These three portraits 21 to 23 are helpful for visual inspection on the density and color balance of the sample print, especially with respect to the flesh colors. Visual inspection means an inspection with the naked eye.

Clothes areas 21CA, 22CA and 23CA of the portraits 21 to 23 are designed to have achromatic colors: black, white and gray. In the shown example, the clothes area 21CA of the portrait 21 is gray, the clothes area 22CA is black, and the clothes area 23CA is white. The achromatic colors in the clothes areas 21CA, 22CA and 23CA provide a measure of density of the sample print for the visual inspection.

Hair areas 21HA, 22HA and 23HA of the portraits 21 to 23 are designed to have the most major hair colors in the region the printer control pictorial tools are supplied. For example, the hair areas 21HA, 22HA and 23HA are any of black, brunette, red, blond, gray or the like.

The eye portion 20 and the portraits 21 to 23 are located within a reference photometric range F2 that is smaller than an entire area F1 of the print 18. In the present embodiment, the reference photometric range F2 is smaller than the entire area F1 by a factor of 0.65 in linear magnification. Therefore, the reference photometric range F2 is smaller than photometric ranges of most types of automatic photo-printers which use the printer control pictorial tools. In FIG. 2, the photometric ranges of the different type automatic photo-printers are shown by other framing lines F3, F4 and F5. For example, the photometric ranges F3, F4 and F5 are smaller than the entire area F1 of the print 18 by linear magnification factors of 0.9, 0.8 and 0.7 respectively.

The reference photometric range F2 contains a complementary color area 25 to the face areas 21FA, 22FA and 23FA. Because pale cyan is complementary to flesh color, the area 25 has a pale cyan hue. The size, color and density of each of the complementary color area 25 and the face areas 21FA, 22FA and 23FA are defined such that the reference photometric range F2 has large area transmittance densities that are approximately equal to that of the conventional Bull's eye negative consisting of a round gray center portion and a gray background. That is, the complementary color area 25 is provided for canceling the hues contained in the face areas 21FA, 22FA and 23FA so that the three color densities of the entire area of the reference photometric range F2 represent a gray color. The sizes, colors and densities of these areas 25, 21FA, 22FA and 23FA may be defined through experimental trials, or by calculations based on relationships between these factors: size, color and density.

Although pale cyan is used as a complementary color to the flesh colors of the face areas 21FA, 22FA and 23FA in this embodiment, because the flesh colors of the face areas 21FA, 22FA and 23FA should be adapted to the most major flesh colors in the region where the printer control pictorial tools are to be used, the area 25 should have an appropriate complementary color according to the flesh colors contained in the face areas 21FA, 22FA and 23FA. Where any of the hair areas 21HA, 22HA and 23HA is designed to have a color other than black or gray, i.e. a chromatic color, an area having a complementary color to that chromatic color should be located within the reference photometric range F2, so as to cancel the hue contained in that hair area 21HA, 22HA or 23HA.

A background area 26 of the print 18, excluding the eye portion 20, the portraits 21 to 23 and the complementary color area 25, has the same gray color as the eye portion 20 has. The density and color of the background area 26 is approximately uniform. This is because if the background area 26 includes a white-black contrast pattern, or a pattern of chromatic colors, especially high-chromatic colors, photometric values obtained from the printer control negative become more dependent on the photometry device of the printer.

According to this configuration, the same photometric values that represent gray are obtained from any of the different photometric ranges F3, F4 and F5 of the different type photo-printers, as those obtained from the reference photometric range F2. Consequently, the portraits 21 to 23 do not have influence on the photometry regardless of the photometric range of the printer.

Since the cameras with a flash device have been widely spread, indoor pictures account for 30% to 50% of the total number of photographs printed in photo-labs these days. As a result, an average hue of pictures of a large variety of scenes comes to approximately neutral gray, though it was once gray with a yellow-greenish tinge when outdoor pictures were the majority of the customer's prints. Therefore, neutral gray is used as the basic color of the printer control pictorial tools of the present invention.

The printer control negative film 10 is usually made by photographing a set of subjects with a camera. To provide the eye portion, a gray plate having a uniform density and a uniform reflectance is used as a subject. The reflectance of the gray plate is about 18%, and its spectral reflectance should be flat enough in a range of spectral sensitivity of the color negative film used for making the printer control negative film 10. Lighting conditions and other conditions are determined such that the background area 26 substantially has the same gray color as the eye portion. The subjects for providing the portraits 21 to 23 should have the same brightness as the gray plate used as the subject to provide the eye portion 20.

It is alternatively possible to make the printer control negative film 10 by copying a master positive. For those photo-printers having a monitor for displaying simulation images of printed pictures, the printer control negative film 10 may also be used for setting up conditions of the monitor and controlling colors and densities of the simulation images.

In the above embodiment, the eye portion 20 and the portraits 21 to 23 are located inside the reference photometric range F2 that is smaller than any photometric ranges of presently used automatic photo-printers. However, it is possible to produce a print control negative for each photo-printer type, and make the printer control negative have a different photometric range that is equal to the photometric range of the designated photo-printer type. Also in that case, portraits and an eye portion are arranged inside the photometric range, and the eye portion and a background have the same gray color. The size, color and density of the portraits are defined such that photometric values obtained from the photometric range are approximately unchanged from those obtained from the eye portion and the background excluding the portraits.

Figure 3:
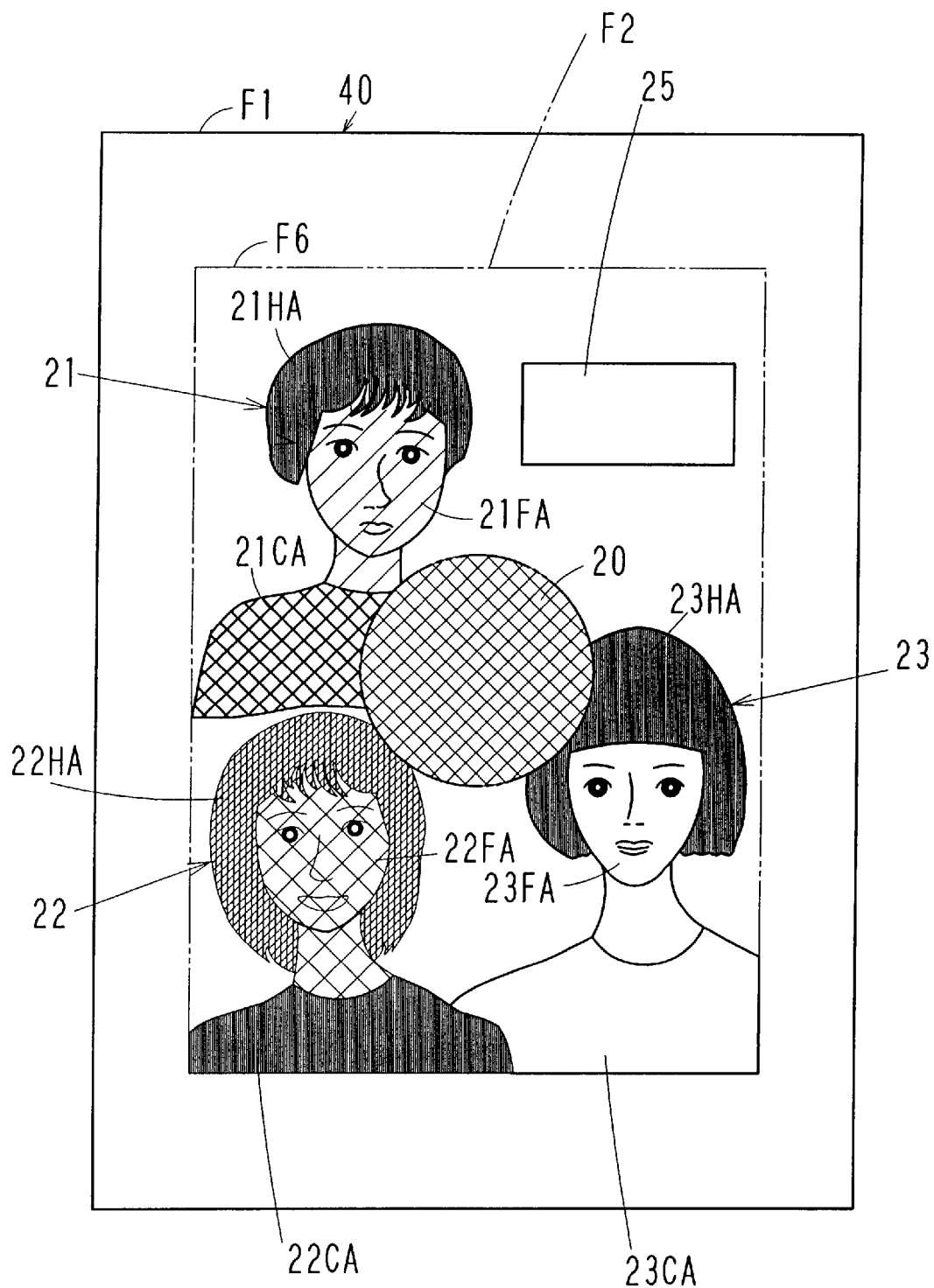
FIG. 3 is an explanatory diagram illustrating an example of print obtained from a printer control negative according to another embodiment of the invention.

FIG. 3 shows a print 40 obtained from a printer control negative specific to a photo-printer type whose photometric range F6 is smaller than an entire area F1 of the print 40 by a linear magnification factor of 0.75. That is, a photometric range F6 of the print 40 is equal to the photometric range F6 of the designated photo-printer. As shown by the same reference numerals, this embodiment contain the same eye portion 20 and the same portraits 21 to 23 in its photometric range F6 as those contained in the reference photometric range F2 of the first embodiment shown in FIG. 2. However, the shape, the size and the layout of the eye portion 20 and the portraits 21 to 23 may be modified appropriately.

Figure 4:
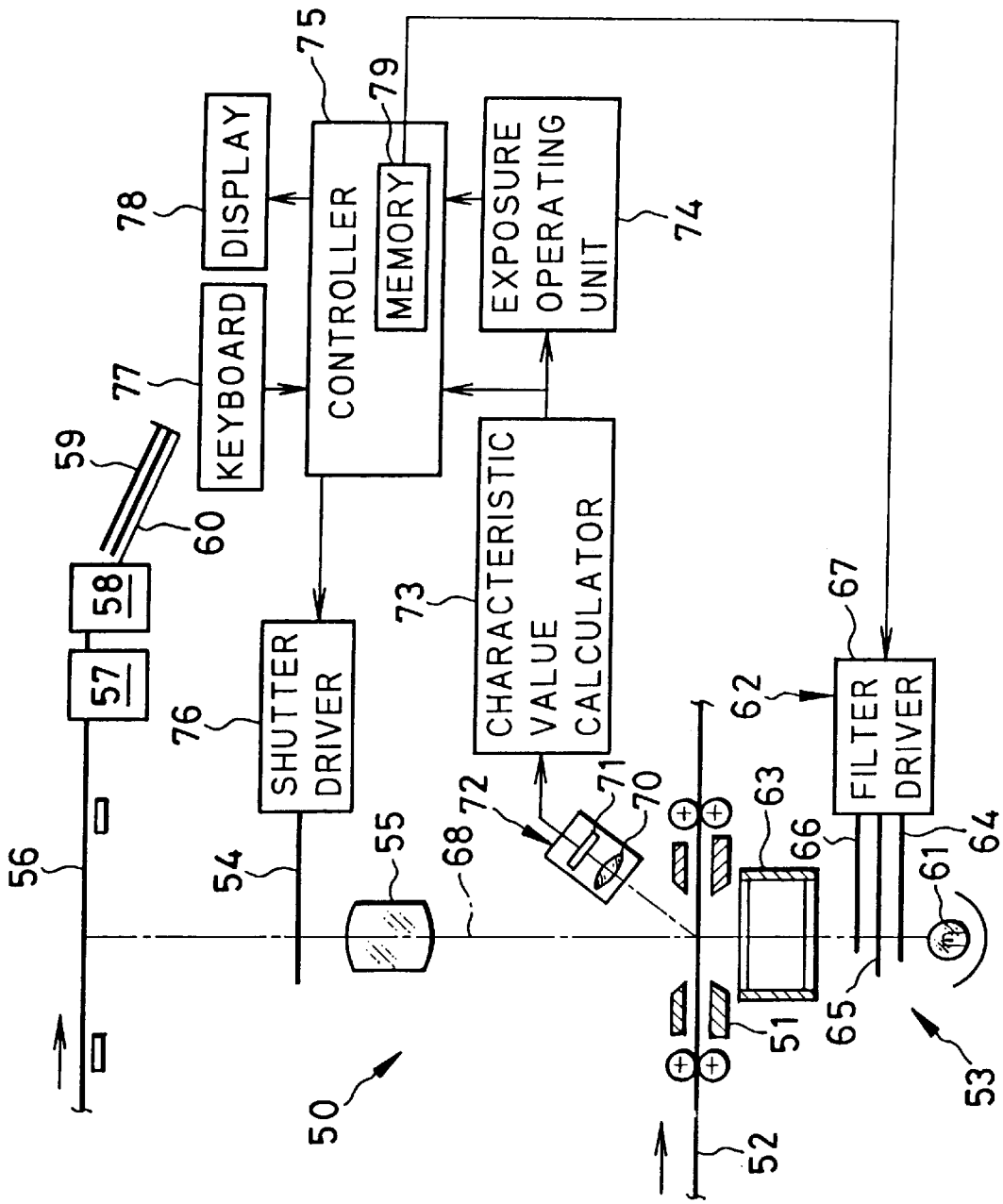
FIG. 4 is a schematic diagram of a printer processor.
Figure 5:
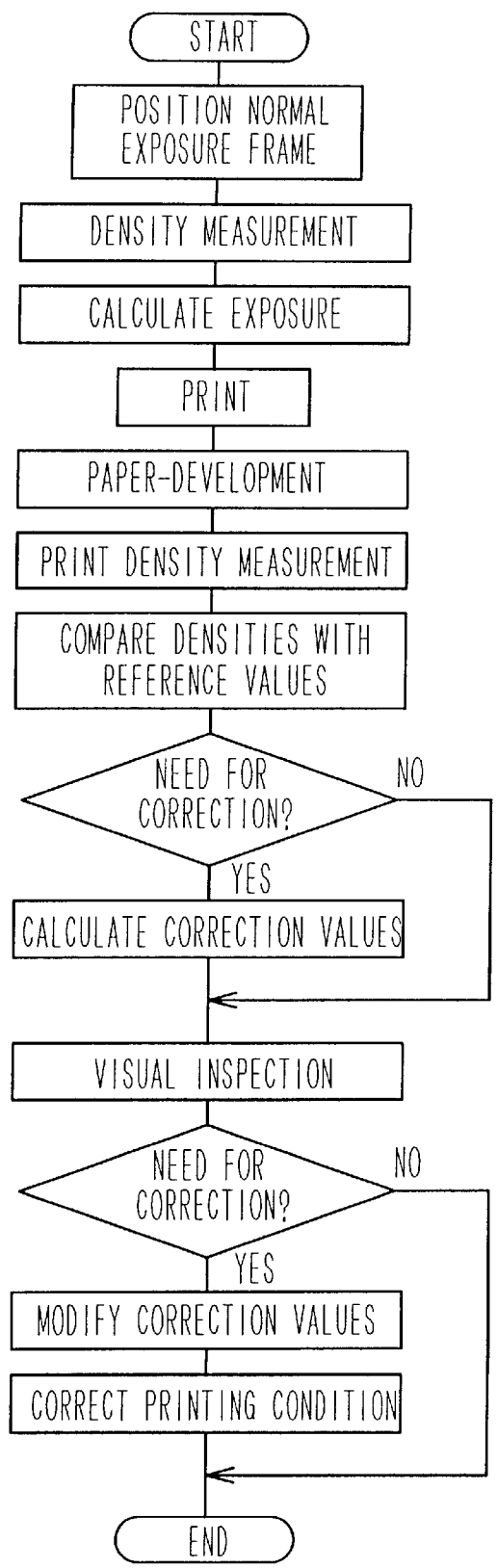
FIG. 5 is a flow chart illustrating a sequence of correcting printing conditions of a photo printer by use of printer control pictorial tools of the invention.

Now, the procedure of setting up printing conditions by use of the printer control negative film 10 will be described with respect to a printer-processor 50 shown in FIG. 4 with reference to a flow chart of FIG. 5.

First, the construction of the printer-processor 50 will be briefly described. To make a print from a frame on a negative film 52, the frame is positioned in a printing position inside a film carrier 51, and is illuminated by a light source section 53. The light transmitted through the frame is focused through a printing lens 55 onto a color paper 56 while a shutter 54 is open, thereby an image of the frame is photographed on the color paper 56. The photographically exposed portion of the color paper 56 is temporarily reserved in a reservoir 57, and then subjected to photofinishing processes in a paper processor 58. The processed portion of the color paper 56 is cut into individual photo-print 59, and the photo-prints 59 are fed out onto a tray 60.

The light source section 53 is constituted of a lamp 61, a light control section 62 and a mixing box 63. The light control section 62 controls color balance and intensity of light by adjusting the amount of insertion of each of cyan, magenta and yellow filters 64, 65 and 66 into a printing light path 68 through a filter driver 67.

An image scanner 72 constituted of a lens 70 and a color image sensor 71 is disposed to face the frame placed in the printing position inside the film carrier 51. The scanner 72 measures three color separation densities of respective pixels of the frame to be printed. Since the film 52 is negative, the measured values are transmission densities in this case. The measure values are sent to a characteristic value calculator 73 to derive characteristic values such as the large area transmission densities (LATD), the lowest and the highest densities of each color and so forth. Also, the characteristic value calculator 73 makes a conventional scene-classification by use of the three color separation densities of the respective pixels of the frame to print, and calculates exposure correction values according to a formula predetermined for each class of the scenes. The characteristic values and the exposure correction values are sent to an exposure operating unit 74. The exposure operating unit 74 then calculates a print-exposure from these values according to a conventional formula. The print-exposure is sent to a controller 75.

The controller 75 may be a well-known microcomputer, and sequentially controls respective portions of the photo-printer 50. The controller 75 determines the insertion amounts of the three color filters 64 to 66 based on the print-exposure, and controls the filter driver 67 of the light control section 62 correspondingly. The controller 75 controls the shutter driver 76 to open the shutter 54 for a determined time. Thus, an image of the frame placed in the printing position is formed through the printing lens 55 onto the color paper 56 for a proper exposure time. A keyboard 77 and a display 78 are connected to the controller 75, for manual switching between print modes as well as for entering commands or data.

When setting up printing conditions in the photo-printer 50 by use of the printer control negative film 10, the operator sets the controller 75 to an printing condition set-up mode through the keyboard 77, and inserts the control negative film 10 in the film carrier 51 to place the normal exposure frame 13 in the printing position. In the printing condition set-up mode, the controller 75 sets up printing conditions according to the sequence as shown in FIG. 5.

First, the scanner 72 measures three color transmission densities of the normal exposure frame 13 from a photometric range that is larger than the reference photometric range F2, e.g. from the photometric range F4 in this instance. Then, large area transmission densities of three colors of the photometric range F4 of the normal exposure frame 13 are calculated for each color in the characteristic value calculator 73, and are sent to the exposure operating unit 74. In the printing condition set-up mode, the characteristic value calculator 73 does not make any scene classification nor provide any exposure correction values according to the formula predetermined for each class of the scenes.

The exposure operating unit 74 calculates a print-exposure from the area transmission densities of three colors, and sends it to the controller 75. The controller 75 determines the insertion amounts of the three color filters 64, 65 and 66 based on the calculated print-exposure, and controls the light control section 62 correspondingly. Thereafter, the shutter 54 is opened for a predetermined time to print the image of the normal exposure frame 13 onto the color paper 56. The printed image is developed and finished in the paper processor 58, and is ejected as a sample print onto the tray 60.

Then, an instruction to measure the density of the reference print is displayed on the display 78. Upon operating a measurement start key after positioning the reference print in a density measuring device which is attached to the photo-printer, three color reference densities are measured from the eye portion 20 of the reference print. The reference densities are displayed on the display 78 and, simultaneously, memorized in a memory 79 of the controller 75. If the reference densities are previously memorized in the memory 79, this density measurement step from the reference print may be skipped.

Next, an instruction to measure densities of the eye portion 20 of the sample print is displayed on the display 78. The sample print is then placed in the density measuring device, to measure three color densities of the eye portion 20 of the sample print. The three color densities of the sample print are also displayed on the display 68, and memorized in the memory 79.

The controller 75 compares the densities of the reference print to those of the sample print, and calculates correction values based on differences between the densities of the sample print and the reference densities.

In addition, the operator compares the sample print with the reference print with respect to the tones of flesh color in the face areas 21FA, 22FA and 23FA of the portraits 21 to 23, and determines density correction values necessary for correcting the tones of the face areas 21FA, 22FA and 23FA of the sample print to be identical to those on the reference print. For example, when the dark flesh color of the portrait 21 on the sample print looks darker than the flesh color of the portrait 21 on the reference print, or when the light flesh color of the portrait 23 on the sample print looks lighter than the flesh color of the portrait 23 on the reference print, the operator determines density correction values for correcting densities of the face areas 21FA, 22FA and 23FA, and enter those values through the keyboard 77.

If the color balance of any of the face areas 21FA, 22FA and 23FA of the sample print looks different from the corresponding area of reference print, the operator determines color correction values for correcting color balance the face areas 21FA, 22FA and 23FA, and enter those values through the keyboard 77. It is also possible to determine density or color correction values by observing the sample print alone.

In accordance with the calculated and/or entered correction values, exposure correction amounts are modified in the exposure operating unit 24 during the practical printing. Thus, properly printed photographs are obtained from most customer's negative frames.

The pictorial image of the printer control pictorial tools of the present invention, i.e. the portraits 21 to 23 in the above embodiments, may be modified in various ways. As shown for example in FIG. 6, illustrating a print 45 obtained from a printer control negative according to another embodiment, three portraits 31, 32 and 33 may be arranged substantially side by side along a lengthwise direction of a printer control negative frame.

In the embodiment of FIG. 6, the portrait 31 has a face area of a standard flesh color, the portrait 32 has a face area of a dark flesh color and the portrait 33 has a face area of a light flesh color. Because two of the three portraits 31 to 33, i.e. the portraits 32 and 33 in this instance, are disposed on opposite horizontal sides of a center gray eye portion 20, the printer control pictorial tools of this embodiment may be preferably used for horizontally elongated frames called panoramic size frame and wide vision size frame. This embodiment is also preferable for use in the round exposure method wherein only a center horizontal zone of the frame is printed for a test.

Although the embodiments shown in FIGS. 2 and 3 have the complementary color area 25 separately from the portraits 21 to 23, it is possible to arrange a complementary color to the flesh color as a part of the pictorial image. For example, in the embodiment shown in FIG. 6, a lower half clothes area 31CA2 of the portrait 31 is colored in a complementary color to the flesh color. An upper half clothes area 31CA1 of the portrait 31 is colored in gray.

It is also possible to arrange the complementary color to the flesh color in the entire clothes area of one or more of the portraits 31 to 33. A background area within a reference photometric area F2 may have a complementary color to the flesh color, or a gray color with a tinge of this complementary color.

The above embodiments adopt three portraits as the pictorial image. The number of portraits may be less than three or more than three, but the most preferable number of portraits is three. Where there are more than three portraits, individual face areas are too small for reliable visual inspection with the naked eye. With less than three portraits, visual inspection becomes less reliable due to the insufficient number of comparable face areas.

The eye portion 20 is not necessarily located at the center of the frame, but may be displaced from the center along a vertical center line or a horizontal center line of the frame. The eye portion 20 may be other than round, but may be triangular, rectangular, polygonal, oblong or the like.

In addition to the use for modifying correction values, the printer control pictorial tools of the present invention may be used for printer calibration, i.e. for setting up default printer conditions, or for supervising printer conditions. The printer control pictorial tools is usable for adjusting brightness and color balance of a monitor display device. In that case, a pictorial image displayed on the display device on the basis of image data obtained from the printer control negative frame is compared with the reference print. The printer control pictorial tools of the invention is also applicable to digital photo-printers for setting up and correcting those parameters relevant to its tone and color reproduction.

It is possible to provide more than one eye portion with different densities, to use for setting up gradation of the digital exposure. When adjusting the monitor display device or the digital photo-printer, image data obtained from the printer control pictorial tool may be written in a memory for use in the adjustment.

Although the present invention has been described with respect to the printer control pictorial tools for the negative film, the present invention is applicable to a printer control pictorial tool consisting of a printer control positive film and its reference print. For setting up printing conditions in a digital photo-printer, only a reference print is used as the printer control pictorial tool.

The present invention is applicable to any kind of photo films, including 135-type, 110-type, 120-type, and IX240-type.

Thus, the present invention is not to be limited to the above embodiments but, on the contrary, various modifications will be possible to those skilled in the art without departing from the scope of appended claims.

What is claimed is:

1. A printer control pictorial tool whose three color densities are measured by a photometry device of a photo-printer, for use in setting up printing conditions of the photo-printer, the printer control pictorial tool comprising:
    a gray area having a neutral gray on a positive;
    a pictorial image including at least a portrait; and
    a gray background area, wherein the gray area and the pictorial image are located within a photometric range that is equal to or less than a range covered by the photometry device of the photo-printer, and the pictorial image is determined in size, color and density such that photometric values obtained from the photometric range are approximately equal to photometric values obtained from the gray area, and wherein the background area has the same average gray density as the gray area has.

2. A printer control pictorial tool as claimed in claim 1, further comprising a complementary color area within the photometric range, the complementary color area having a complementary color to a flesh color of a face area of the portrait.

3. A printer control pictorial tool as claimed in claim 2, wherein the complementary color area is determined in size and density such that photometric values obtained from the photometric range are approximately equal to photometric values obtained from the gray area.

4. A printer control pictorial tool as claimed in claim 3, wherein the complementary color area is provided as a clothes area of the portrait.

5. A printer control pictorial tool as claimed in claim 3, wherein the portrait has a clothes area of an achromatic color, and the complementary color area is provided separately from the portrait.

6. A printer control pictorial tool as claimed in claim 2, wherein the pictorial image includes two portraits having a face area of a dark flesh color and a face area of a light flesh color respectively.

7. A printer control pictorial tool as claimed in claim 6, wherein the pictorial image further includes a third portrait having a face area of a standard flesh color that is lighter than the dark flesh color and darker than the light flesh color.

8. A printer control pictorial tool as claimed in claim 7, wherein the three portraits respectively have a black clothes area, a white clothes area and a gray clothes area.

9. A printer control pictorial tool as claimed in claim 7, wherein at least one of the three portraits has a clothes area that contains the complementary color to the flesh color.

10. A printer control pictorial tool as claimed in claim 6 or 7, wherein the gray area is located at a center of the photometric range, and the portraits are arranged around the gray area.

11. A printer control pictorial tool as claimed in claim 1, further comprising within the photometric range an area having a complementary color to a hair color of the portrait when the hair color is chromatic.

12. A printer control pictorial tool as claimed in claim 1, wherein an image frame consisting of the gray area, the pictorial image and the background area is formed on a photo film under optimum exposure conditions, and a sample print is made from the image frame by the photo-printer on the basis of photometric values obtained from the image frame through the photometry device, to compare the sample print to a reference print that is previously obtained from the image frame under optimum printing conditions.

13. A printer control pictorial tool whose three color densities are measured by a photometry device of a photo-printer, for use in setting up printing conditions of the photo-printer, the printer control pictorial tool comprising:
    a gray area having a neutral gray on a positive;
    at least a portrait whose face area has a flesh color on the positive; and
    a background area, wherein the gray area and the pictorial image are located within a photometric range that is equal to or less than a range covered by the photometry device of the photo-printer, and inside the photometric range the background area on the positive has a gray color with a tinge of a complementary color to the flesh color, and wherein the pictorial image is so determined in size, color and density that photometric values obtained from the photometric range are approximately equal to photometric values obtained from the gray area.

14. A printer control pictorial tool as claimed in claim 13, wherein the background area has the same neutral gray as the gray area outside the photometric range.

15. A printer control pictorial tool as claimed in claim 14, wherein the gray area is located on a vertical or a horizontal center line of the photometric range.

16. A printer control pictorial tool as claimed in claim 15, wherein there are a plurality of portraits in the photometric range, and the portraits are arranged around the gray area that is located at a center of the photometric range.

17. A printer control pictorial tool as claimed in claim 13, wherein the tinge of the background area inside the photometric range approximately cancels the flesh color of the face area.

* * * * *